Sept. 28, 1926.

A. L. MURRAY 1,601,407

TIRE GAUGE

Filed May 18, 1926

Inventor
A. L. Murray.

By
Attorney

Patented Sept. 28, 1926.

1,601,407

UNITED STATES PATENT OFFICE.

ALBERT L. MURRAY, OF AUBURN, INDIANA.

TIRE GAUGE.

Application filed May 18, 1926. Serial No. 109,824.

This invention relates to gauges and has special reference to a gauge for determining the wear of the projections on the tread of an automobile tire.

More particularly the invention relates to a gauge for this purpose which is adapted, because of its simplicity and cheapness, to be used as an advertising device and be freely distributed by garages, repair shops and other houses associated with the automobile trade.

One important object of the invention is to provide a novel and economical gauge especially adapted for determining the wear of the projections usual on automobile tires.

A second important object of the invention is to provide a gauge for this purpose having a novel scale arrangement therein designed to be easily read with the tool in position of use.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1:
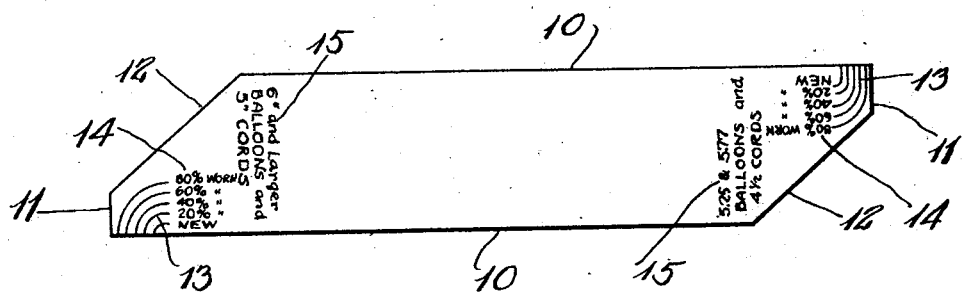
Figure 1 is a plan view showing one side of the gauge.
Figure 2:
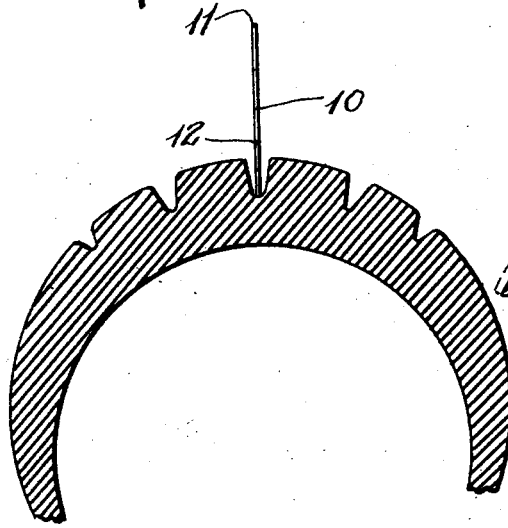
Figure 2 is a sectional view of a portion of a new automobile tire showing the gauge applied thereto.
Figure 3:
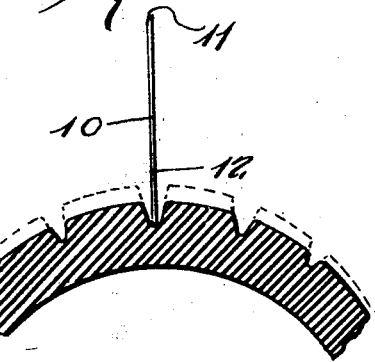
Figure 3 is a similar view of a worn tire with the gauge in use.

The gauge is formed from a strip of material such as cardboard or the like and has parallel side edges 10 and short end edges 11 extending at right angles from each side edge and between each end edge and the opposite side edge is a diagonal edge 12. Thus the gauge has a flat thin body, and tapering blunt end portions, the taper of each end portion being formed by inclining one side only inwardly at the respective end. On the face of the gauge at each end are scale lines 13 which extend in arcs from the side edge near the end each for substantially one-fourth of a circle. These arcs are preferably eccentrically disposed with respect to each other in such manner that their ends remote from the side edge are spaced to a greater distance than the ends at the side edge of said gauge. Percentage indicia 14 are marked near the more widely spaced ends of the arcs.

In use an end of the gauge is placed in one of the non-skid depressions of a tire with the body of the gauge extending radially of the tire. As such depressions vary with different sized tires the scale line spacing at each end and on each side of the gauge and the proper end and side to use is indicated by indicia 15. A notch is now made in the scale edge of the gauge with a knife blade laid flat against the tire or the scale line otherwise noted and by following this line to the wear percentage indicia 14 the same may be read and the wear determined.

There has thus been provided a simple and efficient device of the kind described and for the purpose specified.

Having thus described the invention, what is claimed as new, is:

A gauge consisting of a narrow strip of thin material having parallel side edges and end edges at right angles thereto, and having at each end a set of equally spaced curved scale lines starting from the respective side edge adjacent the respective end edge and curving away from said end edge, said lines being eccentrically disposed with respect to each other to cause the ends remote from the side edge to lie further apart than the ends at the side edge, the strip having its ends sufficiently narrow to permit insertion of the ends in the grooves of automobile tire treads, said strip having sets of scale indicia adjacent the ends of each set of scale lines at the ends remote from the side edges and having tire size indicia associated with respective sets of scale indicia.

In testimony whereof I affix my signature.

ALBERT L. MURRAY.